(12) United States Patent
Brant et al.

(10) Patent No.: US 6,760,807 B2
(45) Date of Patent: Jul. 6, 2004

(54) SYSTEM, APPARATUS AND METHOD PROVIDING ADAPTIVE WRITE POLICY FOR DISK ARRAY CONTROLLERS

(75) Inventors: William A. Brant, Boulder, CO (US);
William G. Deitz, Niwot, CO (US);
Michael E. Nielson, Broomfield, CO (US); Joseph G. Skazinski, Berthoud, CO (US)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 09/993,235

(22) Filed: Nov. 14, 2001

(65) Prior Publication Data

US 2003/0097524 A1 May 22, 2003

(51) Int. Cl.⁷ .............................................. G06F 12/00
(52) U.S. Cl. ...................... 711/114; 711/142; 711/143; 711/133; 711/144
(58) Field of Search ............................... 711/114, 113, 711/142, 143, 144, 135

(56) References Cited

U.S. PATENT DOCUMENTS

| | | | |
|---|---|---|---|
| 5,860,091 A | * | 1/1999 | DeKoning et al. .......... 711/114 |
| 6,052,799 A | * | 4/2000 | Li et al. ........................ 714/13 |
| 6,412,045 B1 | * | 6/2002 | DeKoning et al. .......... 711/135 |

* cited by examiner

Primary Examiner—Kimberly McLean-Mayo
(74) Attorney, Agent, or Firm—R. Michael Ananian; Arthur J. Samodovitz

(57) ABSTRACT

Adaptive write policy for handling host write commands to write-back system drives in a dual active controller environment. Method for adaptive write policy in data storage system, where data storage system includes host system connected to primary controller and alternate controller. Controllers are coupled to system drive that includes one or more disk storage devices. Primary is connected to first memory and alternate is connected to second memory. Primary and alternate manage data storage system in dual-active configuration. Primary controller receives host write command from host system and write data request includes host write data. When system drive is configured with write-back policy, primary determines whether host write command encompasses an entire RAID stripe, and if so, primary processes host write command in accordance with write-through policy. Otherwise, primary processes command in accordance with write-back policy. Reduces amount of host write data that has to be mirrored to alternate controller.

18 Claims, 8 Drawing Sheets

SYSTEM, APPARATUS AND METHOD PROVIDING ADAPTIVE WRITE POLICY FOR DISK ARRAY CONTROLLERS

FIELD OF THE INVENTION

The present invention relates generally to an adaptive write policy for handling host write commands to write-back system drives in a dual active controller environment. More particularly, the present invention relates structure and method for determining if it is more efficient to flush host write data directly to a system drive in accordance with a write-through policy or to mirror the host write data and then to flush the data to the storage medium in accordance with a write-back policy.

BACKGROUND

FIG. 1 is a block diagram that illustrates aspects of a typical active-active controller environment 100. In such active-active controller environments 100, primary controller 102 mirrors host write data 104 to alternate controller 108 provide fault tolerance to system drive 110 implementing a write-hack write policy. Host write data 104 is typically mirrored to alternate controller 108 very host write command 106 received from host system 120. This procedure mirrors host write data 104 and responds to the host system 120 before flushing the host write data 104 to the system drive 110 to provide data fault tolerance to system 100. Host write data 104 is mirrored and protected in the event of a controller 102 or 104 failure.

Referring to the reference numbers in FIG. 1, we illustrate a typical prior art procedure for performing a write-back policy in system 100. First, primary controller 102 receives and accepts host write command 106. Next, primary controller 102 transfers host write data 104 into cache lines (not shown) stored in primary controller's 102 memory (not shown), The primary controller 102 then mirrors host write data 104 to alternate controller 108 (see 3a). Alternate controller 108 verifies to primary controller 102, that the mirrored data was received (see 3b), and once verified, sends write status 124 to the host system 122; and (5) flush dirty host write data 104 to the system drive 110. Finally, dirty host write data 104 is flushed to the system drive 110.

This method is efficient and an effective means of providing fault tolerance, for some but not all cases. For example, host write commands 106 that encompass an entire RAID stripe may be handled differently. Frequently, host writes that fill a full RAID stripe may with reasonable probability fill multiple stripes. Rather than use memory and bus bandwidth transferring the write data to another controller to make a mirror copy a decision is made based on efficiency grounds, to transfer the full RAID stripe to the drive as large transfer to each drive. In such circumstances fault tolerance may be sacrificed using such traditional approach.

FIG. 2 illustrates a situation in which a host write command 106 dirties all data segments of an entire RAID stripe for a system drive configured as a 4+1 RAID 5 system drive 110 utilizing an 8096 (8K) byte stripe size. A 4+1 RAID 5 system drive is a system drive with four data drives (112, 114, 116 and 118) and one parity drive (120). The host write command 106, in this example, transfers 64 blocks of host write data 104 into four cache lines 132 (e.g. 132-1, 132-2, 132-3 and 132-4) defined in primary controller memory 130 of primary controller 102. Four cache lines 132 are used in order to correspond to each of the four data drives 112, 114, 116 and 118. Since a block is equal to approximately one sector (512 bytes), each data drive (112, 114, 116, 118) supports a data stripe size of 16 blocks (8096/521). In addition, since the system drive 110 is using five drives (112, 114, 116, 118 and 120), in a 4+1 RAID 5 configuration, transferring 64 blocks to sector 0 results in 16 (64/4) blocks written to each data drive (112, 114, 116, 118) and 16 blocks to parity drive 120. Therefore the host write command will fill each data drive data stripe, thereby dirtying all blocks for the entire RAID 5 stripe.

One problem with this traditional approach is that whole RAID stripes become dirty as a result of a large sequential write from the host. In this case each write is mirrored, but the cache is filling quickly and the space occupied by the data that was just mirrored is needed for new host write data 104 that is arriving from the host. Older data is flushed to the system drive disk 110.

Therefore, there remains a need to overcome the above limitations in the existing art which is satisfied by the inventive structure and method described hereinafter.

SUMMARY

The present invention overcomes the identified problems by providing an adaptive write policy for handling host write commands to write-hack system drives in a dual active controller environment. The present invention provides an inventive method and apparatus for determining if it is more efficient to flush the host write data directly to a system drive in accordance with a write-through policy versus mirroring the host write data and then flushing the data to the system drive in accordance with a write-back policy.

In accordance with one embodiment of the invention, a method for an adaptive write policy in a data storage system is described, where the data storage system includes a host system connected to a primary controller and an alternate controller. The first and alternate controllers are also connected to a system drive that includes one or more disk storage devices, such as a plurality of hard disk drives or other storage devices configured as a disk or storage array. A Redundant Array of Independent Disc (RAID) based storage system or RAID array is one example of such a storage array. The primary controller is connected to a first memory, and the alternate controller is connected to a second memory. The first and alternate controllers manage the data storage system in dual active configuration.

In accordance with this method, the primary controller receives a host write command from the host system. The write data request includes host write data to be written by the primary controller to the system drive. When the system drive is configured with a write-back policy, the primary controller determines whether the host write command encompasses an entire RAID stripe. If the host write command encompasses an entire RAID stripe, the primary controller processes the host write command in accordance with a write-through policy. Otherwise, the primary controller processes the host write command in accordance with a write-back policy.

In a further embodiment an exemplary controller is described for connecting to a system drive that includes one or more disk storage devices, and for connecting to a host system. The controller is connected to a memory that has a cache line descriptor data structure defined therein. The cache line descriptor data structure is used by the controller to determine whether the host write command encompasses an entire RAID stripe.

In this embodiment, the cache line descriptor data structure includes information about a number of memory tracks allocated for each host write command; a physical disk of a RAID stripe wherein each first memory track is assigned; an offset number of each first memory track; and a block count for each memory track.

In a further embodiment a data storage system providing an adaptive write policy is described. The data storage system includes a first and a second controller operatively coupled to a host system and a system drive. The system drive including one or more disk storage devices. The first and second controller each having an identical respective memory layout, with the primary controller being operatively coupled to a first memory and the second controller being operatively coupled to a second memory. The first and second memory each have a respective data structure defined therein, where the data structure includes a cache line descriptor data structure.

In this embodiment, the cache line descriptor data structure includes information about a number of memory tracks allocated for each host write command; a physical disk of a RAID stripe wherein each first memory track is assigned; an offset number of each first memory track; and a block count for each memory track.

The invention provides many advantages over known techniques. Advantages of the invention include a new approach which adds a decision making step to the traditional approach of handling host write commands to write-back system drives in a dual active controller environment. This inventive decision provides for optimized BUS utilization by reducing the amount of host write data that has to be mirrored to the alternate controller and forcing the host write data directly to system drive for all full RAID stripe writes. The new step determines if it is more efficient to flush the data directly to the storage medium versus mirroring the user data and then flushing the data to the system drive.

BRIEF DESCRIPTION OF THE DRAWINGS

Additional advantages and features of the invention will become readily apparent upon reading the following detailed description and appended claims when taken in conjunction with reference to the following drawings, in which:

DETAILED DESCRIPTION

Embodiments of the invention will now be described in detail by way of illustrations and examples for purposes of clarity and understanding. It will be readily apparent to those of ordinary skill in the art in light of the teachings of this invention that certain changes in modifications may be made thereto without departing from the spirit or scope of the invention or to the appended claims. For purposes of simplifying the description, a process of caching data, by a controller, to an alternate, or partner controller is hereinafter, referred to as a "cache data mirror process" or simply as a "cache mirror process". A controller that is performing a cache data mirror process is referred to as a primary or "mirroring controller." A controller that is receiving data that is being mirrored by another controller to the controller, is referred to as an "alternate controller." Any controller may operate as both a primary controller and an alternate controller, even at the same time by transferring data on different data channels.

Figure 1:
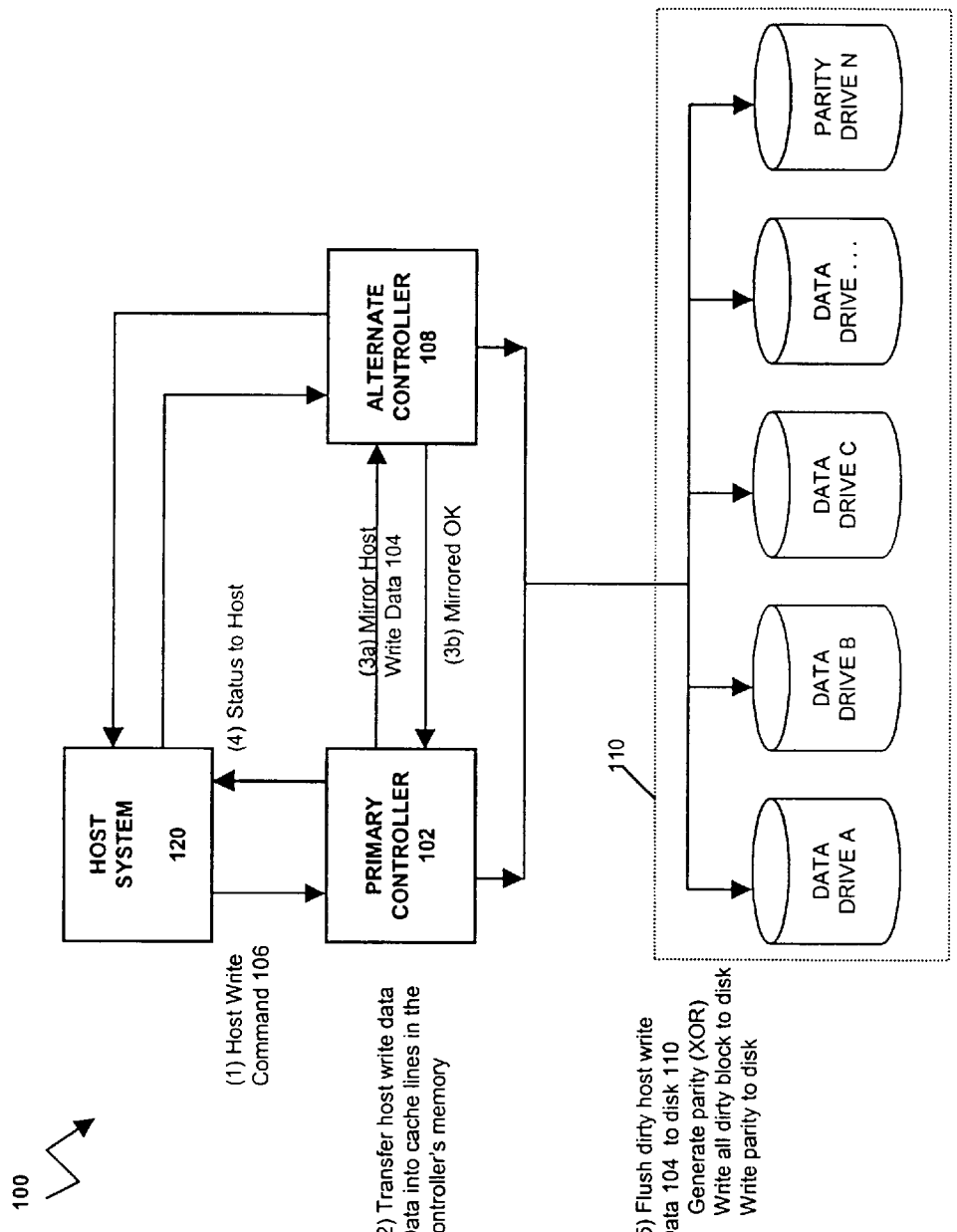
FIG. 1 depicts a block diagram illustrating aspects of a traditional data storage system using a write-back write policy, being managed by two controllers in dual active configuration as known in the art.
Figure 2:
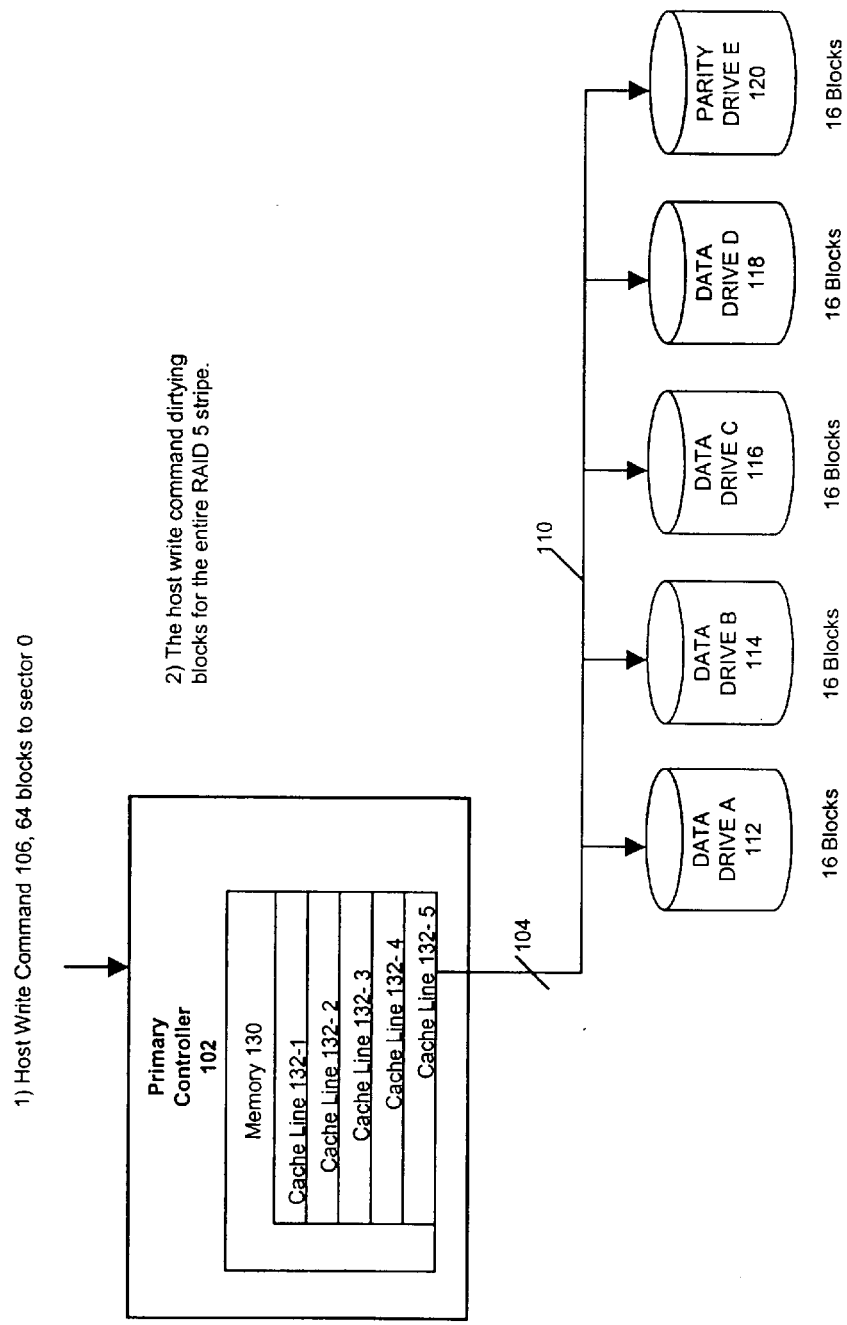
FIG. 2 depicts a block diagram illustrating aspects of a conventional data write operation which dirties an entire RAID stripe.
Figure 3:
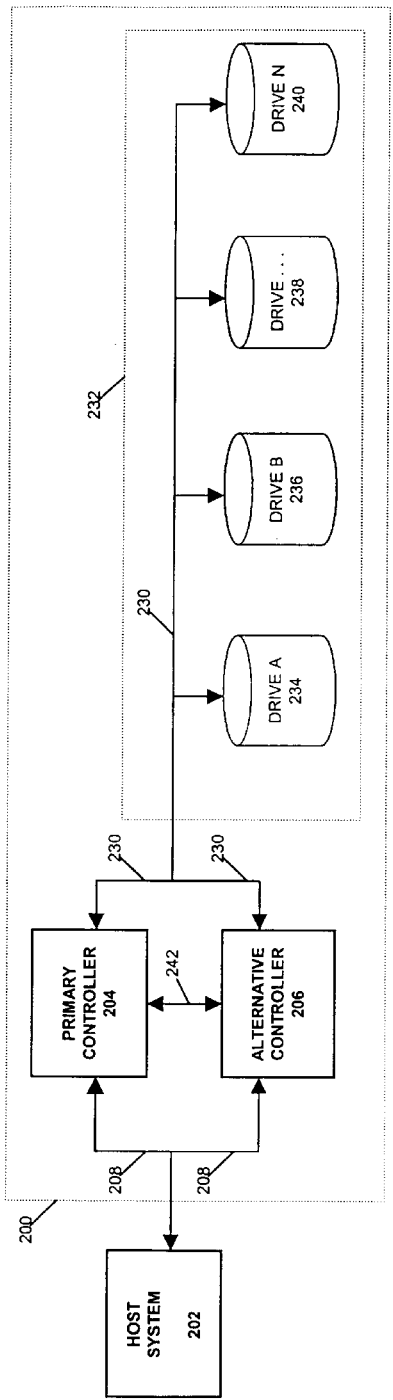
FIG. 3 depicts a block diagram illustrating aspects of a conventional data storage system being managed by two controllers in dual active configuration.

To illustrate a dual active controller configuration according to the teachings of one embodiment of the present invention, referring to FIG. 3, there is shown a data storage system with controllers in dual active configuration 200. Host system 202, for example, a general-purpose computer, is connected to a primary controller 204 and an alternate controller 206 across host peripheral bus 208. Primary controller 204 and alternate controller 206 may typically be embodied as separate plug-in adapter cards in host system 202 (as is the case with many general-purpose computer systems). Alternatively, primary controller 204 and alternate controller 206 may be integrated as respective controller chips on a motherboard of host system 202, or respectively configured as separate external controller units.

Primary controller 204 and alternate controller 206 are connected to a system drive 232, including for example one or more SCSI, Fibre Channel, or storage device across SCSI, Fibre Channel, or any other storage interconnection bus, or interconnection structure, protocol, or method 230. SCSI device types include, for example, disk drives, tape drives, printers, CD-ROM drives, scanners, optical disks, etc. Although the SCSI devices can be limited to a single type, such as disk drives, or also include SCSI devices of the types listed above, the SCSI devices include drive A 234, drive B 236, drive . . . 238, and drive N 240. In this example, for purposes of illustration and convenience there are shown only four drives, drive A 234, drive B 236, drive . . . 238, and drive N 240. However, as can be appreciated, the present invention is applicable to data storage systems with any number of data storage devices. System drives 232 and Channel bus 230 may be of types other than SCSI or Fibre Channel.

Primary controller 204 and alternate controller 206 are connected by cable 242 or other communication link (such as fiber optic, wireless or other means), for sending, by each respective controller, configuration information. In one embodiment this link is conventionally an RS-232 type cable. Another method of communications is to allow the controllers 204 and 206 to communicate with each other through the SCSI/Fibre Channel bus 230. The latter technique may be used in the Mylex Family of external controllers such as the DACSX, DACFL, DACSF, or DACFF controllers.

Such configuration information includes, for example, one or more of state of the controller, RAID group configuration(s) and options, and controller options, each respective controller's cache information allowing a controller's respective alternate controller to keep track of both the tasks that its respective partner controller is working on, and the tasks that its respective partner controller is scheduled to work on.

Figure 4:
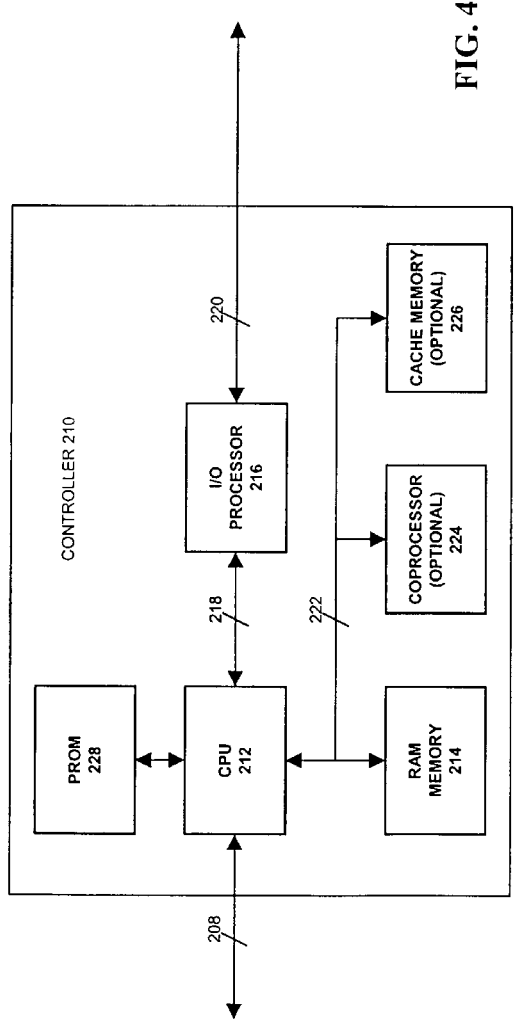
FIG. 4 depicts a block diagram illustrating aspects of a controller, according to one embodiment of the present invention.

Referring to FIG. 4, there is shown a block diagram illustrating aspects of controller 210 according to an embodiment of the present invention. The controllers illustrated in FIG. 3 (primary controller 204 and alternate controller 206) are similar in structure and function to controller 210.

Controller 210 includes a processor, typically a central processing unit, or "CPU" 212 connected to host peripheral bus 208, for performing basic system level procedures to manage a data storage system, and for executing application procedures stored in memory 214. Such application procedures are discussed in greater detail below. CPU 212 is also coupled to secondary peripheral bus 218 as one or more I/O processors, for example, I/O processor 216. I/O processor 216 is coupled to physical interface 220, acting as an interface between secondary peripheral bus 218 and physical interface 220 which connects to other I/O devices which may be of any conventional type, for example, SCSI I/O devices of the type discussed in greater detail above with reference to FIG. 3. CPU 212 is also coupled to local bus 222 internal to controller 210, which in turn is coupled to memory 214. CPU 212 is connected to the optional co-processor 224 through local bus 222.

Coprocessor 224 is optional, and if present, coprocessor 224 is operatively coupled to on-board cache memory 226 which is used by coprocessor 224 as volatile storage to temporarily store data most recently read and written by a host system, for example host system 202 (see FIG. 3). If coprocessor 224 is not present, CPU 212 caches data received from a host system into cache memory 226.

Coprocessor 224, if present, also performs error correction code encoding and decoding on data that is written to and read from the peripheral devices. Error correction code encoding and decoding are well-known procedures of verifying and maintaining data integrity, especially in magnetic disk drive devices, and are therefore, not described in further detail here.

In a preferred embodiment, controller 210 may be implemented using firmware customization (enhancements) to: (a) a DAC960 series of controllers, such as the RAID controller made by Mylex™ of Fremont, Calif.; (b) CPU 212 is a 32-bit Intel i960 RISC microprocessor with multitasking functionality; (c) PROM 228 predetermined amount of flash erasable/programmable read only memory (EPROM); (d) memory 214 is a user configurable amount of RAM where user configurable amounts equal from 8 MB RAM to 256 MB of RAM that can be installed in increments of 8 MB; (e) second peripheral bus 218 secondary PCI bus; and (f) physical interface 220 is also a PCI bus.

Figure 5:
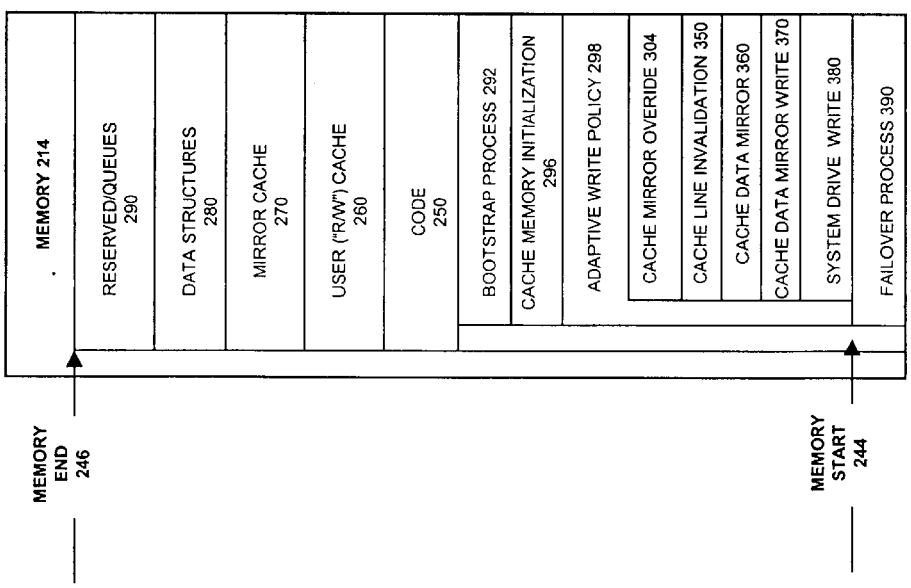
FIG. 5 depicts a block diagram illustrating aspects of a controller's random access memory, according to one embodiment of the present invention.

Referring to FIG. 5, there is shown memory 214, according to one embodiment of the present invention. Memory 214 includes, for example: (a) code block 250, for storing executable procedures that perform the method of the present invention; (b) user, read/write ("RJW") cache 260, for storing data cached by a controller in response to host system read and write data requests; (c) mirror cache 270, for storing data cached by a controller in response to a cache data mirroring operation by an alternate controller; (d) data 280, for storing, for example, by a controller, data structures that are allocated by the executable procedures such as a computer program, stored in code 250; and (e) reserved/queues 290 memory block, for storing, by a controller, for example, information for scheduling queues, and configuring disk drives with configurable default parameter settings. Such scheduling queues can include, for example, linked lists of I/O processes tracking the completion of write requests from a host system.

I/O processes are known in the art and discussed only briefly here. An I/O process performs a series of steps to either store or retrieve information from one or more physical disk storage devices, such as the disk drives described above, that are addressable by a controller. An I/O process is typically created by a controller in response to sending a command request, received from a host system, to one or more disk storage devices. An I/O process typically ends after command completion information has been returned to the host system by the controller, which typically occurs after a controller has received command completion information from each disk storage device in a system drive that is executing the command that the particular I/O process managing. However, according to one aspect of this invention, such command completion information is sent to a host system after data corresponding to a write data request is mirrored to an alternate controller, and before the data is written by a controller to one or more disk storage devices in the system drive.

In a preferred embodiment of the present invention, memory 214 is allocated on each controller 204 and 206 in the data storage system 200 according to a predefined scheme where: (a) a first memory address is located at memory start 244 (or at some other arbitrary first memory location), and a last memory address is located at memory end 246 (or at some other arbitrary fixed second memory location); and (b) each controller organizes the respective locations of code block 250, user cache 260, mirror cache 270, data structures 280, and reserved/queues 290, in a similar manner. To illustrate this, for example, the location of code 250, and reserved/queues 290 in memory 214 on the primary controller, is the same as the location of code 250 in memory 215 on the alternate controller; the location of user cache 260 in memory 214 on primary controller, is the same as the location of user cache 260 in memory 215 on an alternate controller; and the like.

Figure 6:
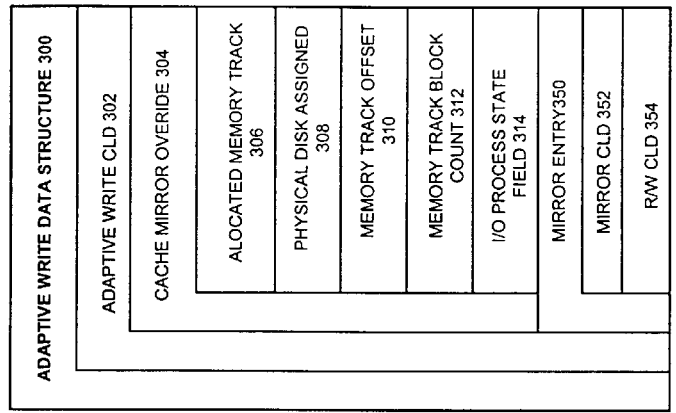
FIG. 6 depicts an adaptive write policy data structure according to a further embodiment of the invention.

In a preferred embodiment, data structure 280 is organized into several memory blocks, including, for example as depicted in FIG. 6:

- A mirror entry memory block (350), for storing, by a controller, pre-allocated data structures that are used to maintain and track cache lines mirrored by an alternate controller to this controller. Such other data structures include, for example, mirror cache line descriptor ("CLD") 352 data structures, which are discussed in greater detail below
- An adaptive write data structure memory block 300, for storing, by this controller, CLD data structures ("adaptive CLD") 302 that were mirrored to this controller by an alternate controller. These adaptive CLD data structures are advantageously used by this controller, to determine whether to process a host write command in accordance with a write-through or write-back policy. Adaptive write CLD data structures are discussed in greater detail below
- A read/write ("R/W") CLD memory block 354, for storing, by this controller, CLD data structures that maintain and track cache lines in user cache 260.

Exemplary CLD data structures such as may be used with the invention are described a greater detail below.

It can be appreciated that other memory organization schemes could be used by the present invention. As noted above, it is desirable to use the same or substantially the same memory layout scheme or organization across each respective controller in a data storage system.

To provide an adaptive write policy in the data storage system 200, the present invention uses a set of data structures that provide, for example, the following types of information: (a) mirror data, (b) RAID stripe data, (c) invalidation data, and (d) write-through data.

Mirror data tracks the status and location in an alternate controller's memory, for example, mirror cache 115 (see FIG. 5), of data mirrored, by a controller, to an alternate controller, such information includes, for example, an indication of which blocks of a cache line have not yet been written to a disk drive.

RAID stripe data tracks: (1) a number of physical disks allocated for each host write command; (2) a physical disk of a RAID stripe wherein each first memory track is assigned; (3) a controller, such information includes, for example, the address in user cache, an offset number of each first memory track; and (4) a block count for each first memory track.

Invalidation data facilitates determining mirror cache line blocks, for example, mirror cache 115 (see FIG. 3), by a controller, that overlaps with host write data.

Write-through data organizes the execution, by controller, of host write commands that are written directly to the system drive without a host mirror operation.

In one embodiment, the set of data structures are maintained by controller 210 in memory 214 (see FIG. 4). In yet another embodiment of the present invention, the below described data structures and structural elements are maintained by controller 210 in optional cache memory 226.

Referring to FIG. 6, there are shown aspects of a set of data structure relationships for implementing the adaptive write policy according to one embodiment of the present invention. In view of this disclosure, it can be appreciated that a person of ordinary skill in the art could form a different set of structural relationships than the set of structural relationships shown in FIG. 6, without departing from the spirit and scope of this disclosure.

Adaptive write data structure 300 includes a pointer to adaptive write CLD 302. CLD 302 includes a reference: (a) to cache mirror override 304, that is stored in user cache 260 (see FIG. 3); (b) a reference to cache line invalidation 350; (c) a reference to cache data mirror 360; (d) a reference to cache data mirror write 370; and (e) system drive write 380. We now discuss the structural references contained in cache mirror override 304.

Cache mirror override operation 304 contains a pointer to: (a) allocated memory track 306; (b) physical disk assigned 308; (c) memory track offset 310; (d) memory track block count 312; and (e) I/O process state field 314.

Figure 7:
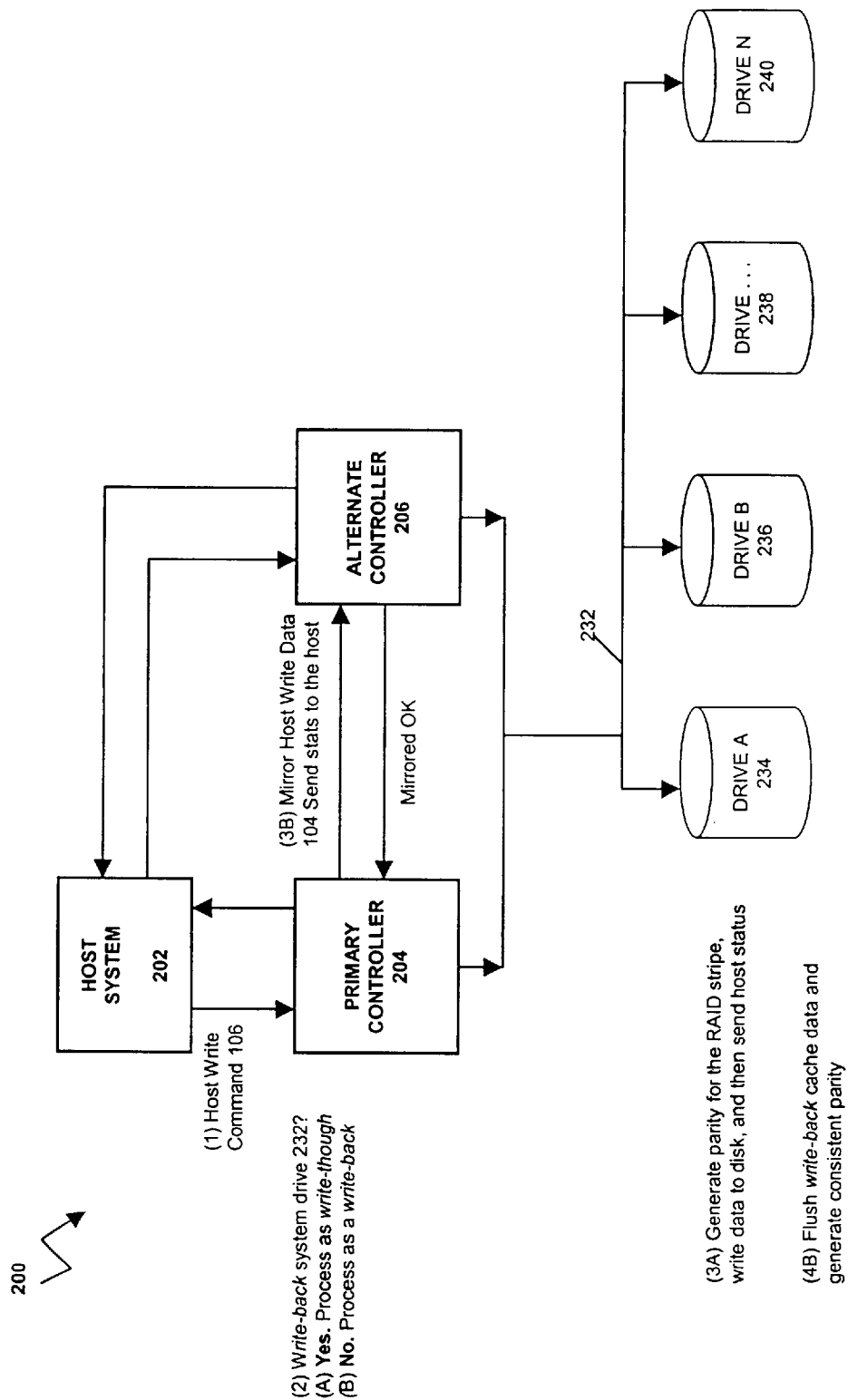
FIG. 7 depicts an example of the adaptive write policy as taught by the present invention.

FIG. 7 depicts an example of the data storage system 200 in a dual active configuration for implementing the adaptive host write policy as taught by the present invention. The data storage system 200 is configured as described above with reference to FIG. 3, utilizing controllers 204 and 206 in a dual active configuration. The controllers 204 and 206 are configured as described with reference to FIG. 4. Referring now to FIG. 5, the primary controller 204 receives a host write command 106 from the host system 202 as indicated as at (1) The primary controller determines whether the system drive 232 is a write-back or write-through system drive by analyzing a write policy property of a system drive configuration data structure stored in the controller memory. Details concerning the system drive configuration data structure will be apparent to those skilled in the art of controller devices and are therefore not set forth herein except as needed for a proper understanding of the invention.

Assuming a write-back system drive, the primary controller determines whether to override cache data mirror process as indicated at (2) Using the cache data mirror override operation 304, the primary controller 204 determines if the host write command 106 encompasses an entire RAID stripe. If so, the host write command 106 is processed in accordance with a write-through policy as indicated at (2a) and (3a). Processing the host write command in accordance with a write-through policy requires generation of parity for the RAID stripe, writing the data to disk and sending status to the host system 202. Otherwise, the host write command is processed in accordance with at write back policy as indicated at (2b), (3b) and (4b). Processing the host write command in accordance with a write back policy requires: mirroring the host write data to alternate controller 200 and sending status to the host at (3b); and flushing write-back cache and generating consistent parity at (4b). Procedural method steps for practicing the adaptive write policy as taught by the present invention are now described.

Attention is now directed to an exemplary operational scenario. After a controller, for example, controller 210 (see FIG. 4), is powered on, it performs bootstrap procedure 292, which comprises a set of initialization procedures to prepare a controller so that it can, for example, read data requests and write data requests, from a host system. Such initialization procedures include, for example, loading executable application code such as those application codes above, into code 250 (see FIG. 5).

Bootstrap process 292 also stores in reserved/queues 290, system configuration data, such as, for example, the number and physical properties of disk storage devices in a data storage system (see FIG. 5).

After bootstrap process 292 completes its initialization process, cache memory initialization process 296 allocates all remaining bytes of memory 214 (or optional cache memory 226) (see FIG. 4) for cache related data and data structures, such as, for example, those data structures described above. We now discuss cache memory initialization process 296.

Cache memory initialization procedure 296 sets up a data structure in memory, for example, in either memory 214, or in cache memory 226 (depending on whether optional cache memory 60 is available and being used by a controller), to accommodate data and data structures, as described above, used by procedures of the present invention to: (a) mirror data to an alternate controller; (b) override the mirror operation for certain most write commands; and (c) invalidate overlapping cache lines in the alternate controller memory 215.

For purposes of simplifying the description, we discuss cache memory initialization process 296 with respect to initializing memory 214. However, it can be appreciated that in the event that optional cache memory 226 (see FIG. 4) is used, the procedures required for cache memory initialization process 296 to initialize optional cache memory 226 are analogous to the procedures required to initialize memory 214 (with the exception that all of cache memory 226 would be used for such data and data structures as compared to a proportional amount).

Figure 8:
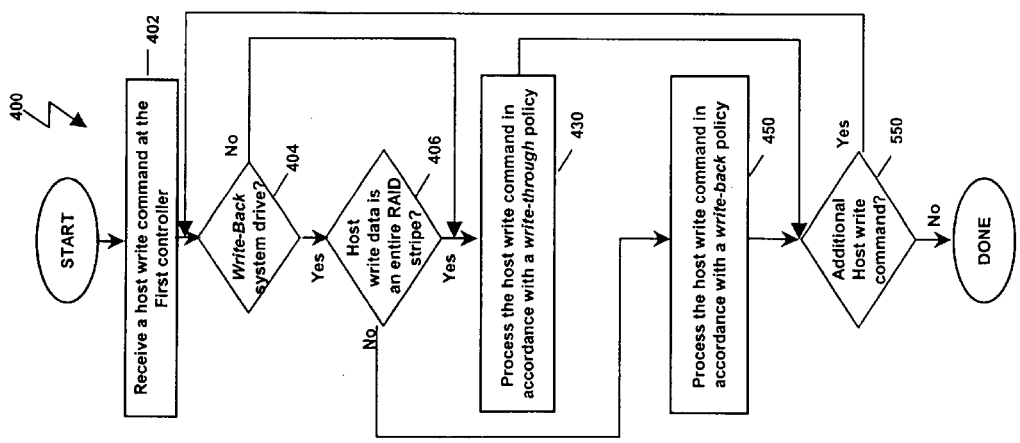
FIG. 8 depicts a procedure for using an adaptive write policy in a dual active controller configuration according to an embodiment of the invention.

FIG. 8 depicts an embodiment of a method for an adaptive write policy 400 in a data storage system 200, for example, as depicted in FIGS. 3 and 7. At step 402, the primary controller 204 receives a host write command 106 from the host system 202. The host write command 106 includes host write data 104 to be written by the primary controller 204 to the system drive 232. At step 404, when the system drive 232 is configured with a write-back policy, the primary controller 204 determines whether the host write command 106 encompasses an entire RAID stripe. At step 426, if the host write command 106 encompasses an entire RAID stripe, the primary controller 204 processes the host write command 106 in accordance with a write-through policy. At step 450, otherwise, the primary controller 204 processes the host write command 106 in accordance with a write-back policy.

Figure 9:
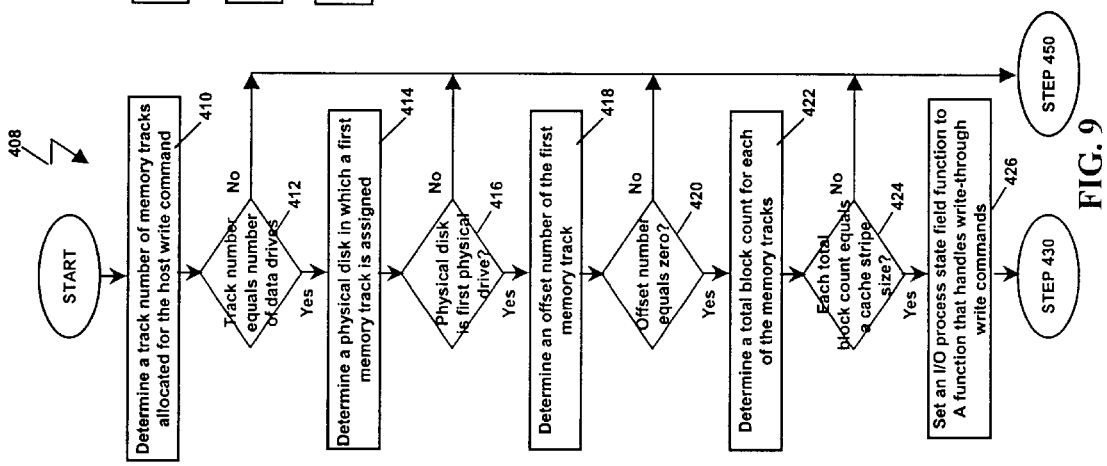
FIG. 9 depicts additional procedural method steps for using an adaptive write policy in a dual active controller configuration according to a further embodiment of the invention.

FIG. 9 depicts procedural method steps 408 for determining whether the host write command 106 encompasses an entire RAID stripe of step 406, for example, in the data storage system 200, as depicted in FIGS. 3, 4 and 5. At step 410, a track number of memory tracks allocated for the host write command 106 is calculated. At step 412, it is determined whether the track number is equal to a number of data drives in the RAID stripe. When the track number is equal to the number of data drives in the RAID stripe, at step 414 a physical disk of the RAID strip is calculated in which a first memory track of the host write data 104 is assigned. At step 416, it is determined whether the physical disk is a first physical disk of the RAID stripe. When the physical disk is the first physical disk of the RAID stripe, at step 418 an offset number of the first memory track is calculated. At step 420, it is determined whether the offset number equals zero. When the offset number equals zero, at step 422, a total block count for each of the memory tracks is calculated. At step 424, it is determined whether each total block count is equal to a cache stripe size. When each total block count is equal to the cache stripe size, at step 426 an I/O process state field is set to a function that handles write-through write commands.

Figure 10:
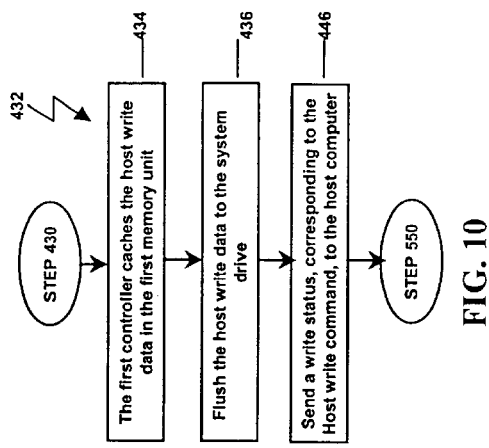
FIG. 10 depicts additional procedural method steps for processing a host write command in accordance with a write-through policy according to a further embodiment of the invention.

FIG. 10 depicts procedural method steps 432 for processing the write command in accordance with a write-through policy of step 430, for example, in the data storage system 200, as depicted in FIGS. 3, 4 and 5. At step 434, the primary controller 204 caches the host write data 104 into the first memory 214. At step 436, the primary controller 204 flushes the host write data 104 to the system drive. Finally at step 446, the primary controller 204 sending a write status, corresponding to the host write command 106, to the host system.

Figure 11:
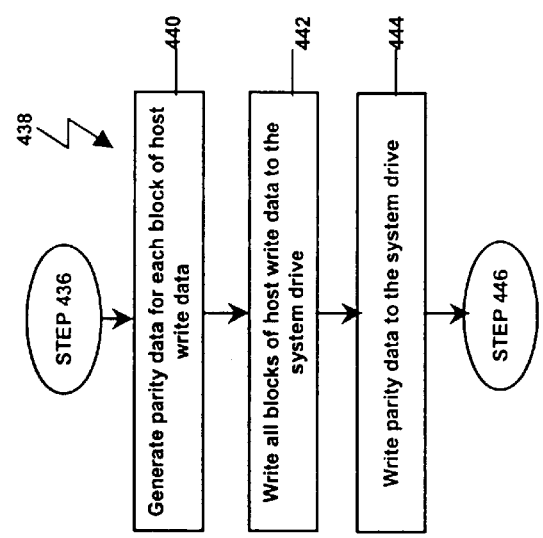
FIG. 11 depicts additional procedural method steps for flushing host write data to a system drive according to a further embodiment of the invention.

FIG. 11 depicts procedural method steps 438 for flushing the host write of step 436, for example, in the data storage system 200, as depicted in FIGS. 3, 4 and 5. At step 440, the primary controller 204 generates parity data for each block of host write data 104. At step 442, the primary controller 204 writes all blocks of host write data 104 to the system drive. Finally at step 444, the primary controller 204 writes the parity data to the system drive.

Figure 12:
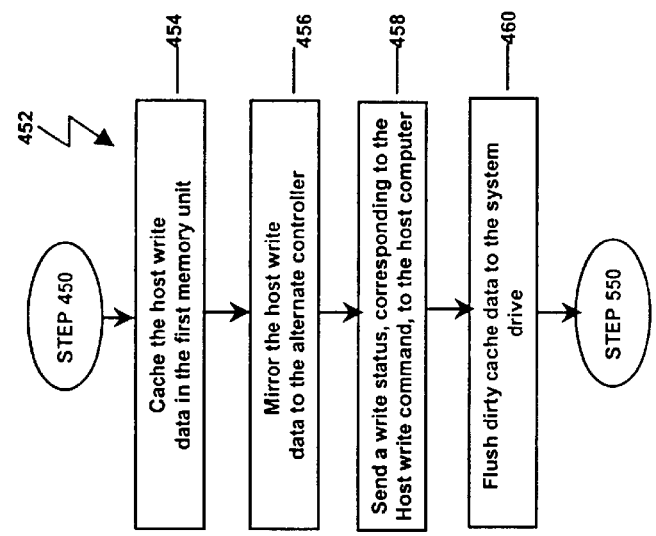
FIG. 12 depicts additional procedural method steps for processing a host write command in accordance with a write-back policy according to a further embodiment of the invention.

FIG. 12 depicts procedural method steps 452 for processing the write command in accordance with a write-back policy of step 450, for example, in the data storage system 200, as depicted in FIGS. 3, 4 and 5. At step 454, the primary controller 204 caches the host write data 104 into the first memory 214. At step 456, the primary controller 204 mirrors the host write data 104 to the alternate controller 206, such that the alternate controller 206 copies the host write data 104 into the second memory 215. At step 458, the primary controller 204 sends a write status, corresponding to the host write command 106, to the host system. Finally at step 460, the primary controller 204 flushes dirty cache data to the system drive.

Figure 13:
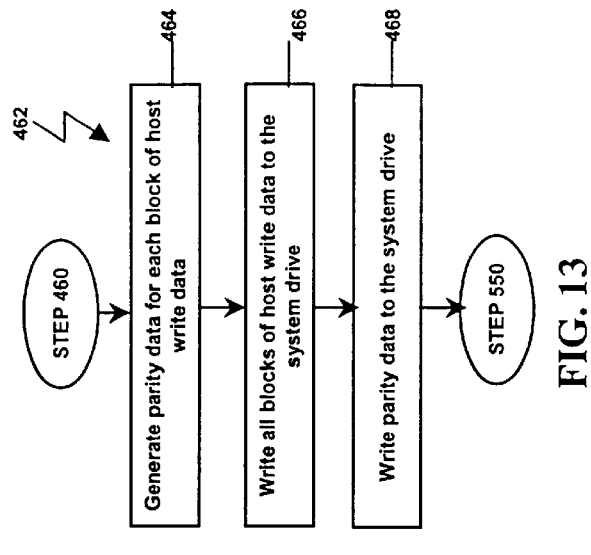
FIG. 13 depicts additional procedural method steps for flushing host write data to a system drive according to a further embodiment of the invention.

FIG. 13 depicts procedural method steps 462 for flushing dirty cache data of step 460, for example, in the data storage system 200, as depicted in FIGS. 3, 4 and 5. At step 464, the primary controller 204 generates parity data for each block of dirty cache data. At step 466, the primary controller 204 writes all blocks of dirty cache data to the system drive. Finally at step 468, the primary controller 204 writes the parity data to the system drive.

Figure 15:
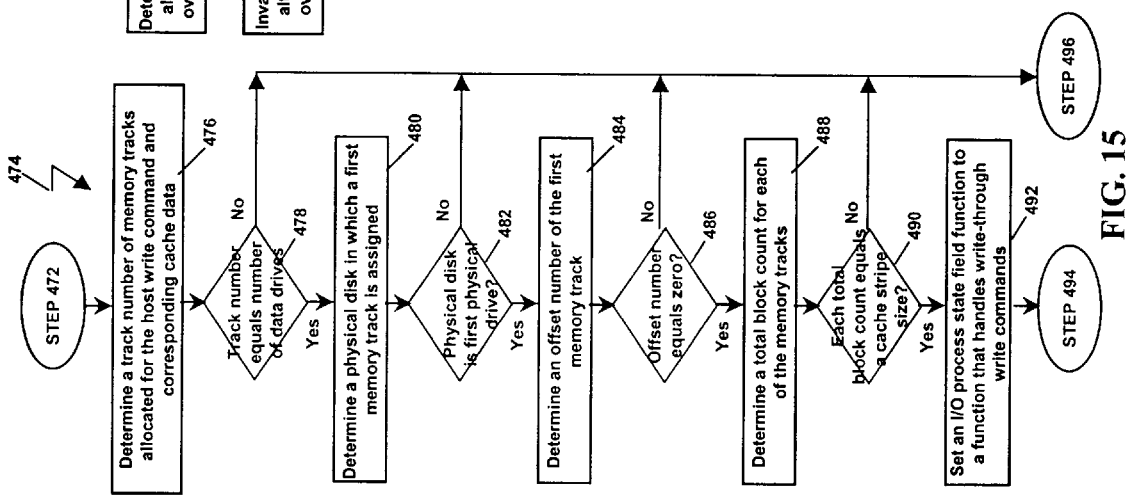
FIG. 15 depicts additional procedural method steps for using an adaptive write policy in a dual active controller configuration according to an exemplary embodiment of the invention.
Figure 14:
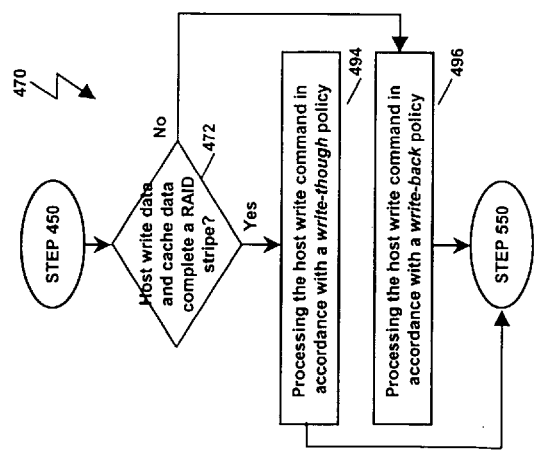
FIG. 14 depicts additional procedural method steps for using an adaptive write policy in a dual active controller configuration according to a further embodiment of the invention.

FIG. 14 depicts additional procedural method steps 470 for processing the write command in accordance with a write-back policy of step 450, for example, in the data storage system 200, as depicted in FIGS. 3, 4 and 5. At step 472, the primary controller 204 determines whether the host write data 104 in combination with cache data in the first memory 214 complete an entire RAID stripe. When the host write data 104 in combination with the cache data complete an entire RAID stripe, at step 494 the primary controller 204 processes the host write command 106 in accordance with a write-through policy. Otherwise at step 496, the primary controller 204 processes the host write command 106 in accordance with a write-back policy FIG. 15 depicts procedural method steps 474 for determining whether the host write data 104 in combination with the cache data complete an entire RAID stripe of step 472, for example, in the data storage system 200, as depicted in FIGS. 3, 4 and 5. At step 476, a track number of memory tracks allocated for the host write command 106 and corresponding cache data is calculated. At step 478, it is determined whether the track number is equal to a number of data drives in the RAID stripe. When the track number is equal to the number of data drives in the RAID stripe, at step 480 a physical disk of the RAID strip is calculated in which a first memory track of the host write data 104 and corresponding cache data is assigned. At step 482, it is determined whether the physical disk is a first physical disk of the RAID stripe. When the physical disk is the first physical disk of the RAID stripe, at step 484 an offset number of the first memory track is calculated. At step 486, it is determined whether the offset number equals zero. When the offset number equals zero, at step 488, a total block count for each of the memory tracks is calculated. At step 490, it is determined whether each total block count is equal to a cache stripe size. When each total block count is equal to the cache stripe size, at step 492 an I/O process state field is set to a function that handles write-through write commands.

Figure 16:
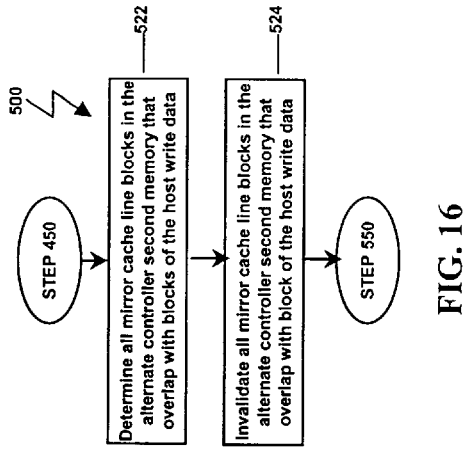
FIG. 16 depicts additional procedural method steps for using an adaptive write policy in a dual active controller configuration according to an exemplary embodiment of the invention.

FIG. 16 depicts additional procedural method steps 520 for processing the write command in accordance with a write-back policy of step 450, for example, in the data storage system 200, as depicted in FIGS. 3, 4 and 5. At step 522, the primary controller 204 determines all mirror cache line blocks in the alternate controller 206 second memory 215 that overlap with blocks of the host write data 104. At step 522, the primary controller 204 invalidates all mirror cache line blocks in alternate controller 206 second memory 215 that overlap with blocks of the host write data 104.

By way of highlighting certain aspects of the invention, the present invention uses an adaptive write CLD data structure in order to track the stripe size of a host write command. The adaptive write CLD stores: (1) a number of memory tracks allocated for each host write command; (2) a physical disk of a RAID stripe wherein each first memory track is assigned; (3) an offset number of each first memory track; and (4) a block count for each memory track. Using the host write command information stored in by the adaptive write CLD, the inventive structure and method described herein determines whether it is more efficient to flush the data directly to the storage medium versus mirroring the user data and then flushing the data to the system drive. When the host write command encompasses an entire RAID stripe, the host write command is processed in accordance with a write-through write policy. In doing so, the inventive structure and method described herein results in optimized bus utilization by reducing the amount of host write data that has to be mirrored to the alternate controller.

Exemplary embodiments have been described with reference to specific configurations. Those skilled in the art will appreciate that various changes and modifications can be made while remaining within the scope of the claims. It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a data storage system, it will be appreciated by those skilled in the art that the teachings of the present invention can be applied to other data processing systems utilizing system drives configured differently than the 4+1 RAID 5 system drive described herein without departing from the scope and spirit of the present invention.

The invention provides many advantages over known techniques. Advantages of the invention include a new approach which adds a decision making step to the traditional approach of handling host write commands to write-back system drives in a dual active controller environment. This inventive decision provides for optimized bus utilization by reducing the amount of host write data that has to be mirrored to the alternate controller and forcing the host write data directly to system drive for all full RAID stripe writes. The new step determines if it is more efficient to flush the data directly to the storage medium versus mirroring the user data and then flushing the data to the system drive.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. All patents and publications referenced herein are hereby incorporated by reference.

What is claimed is:

1. A method for storing data in a data storage system including a host system that is operatively coupled to a primary controller and an alternate controller, the primary controller and the alternate controller being operatively connected to a system drive that includes one or more data storage devices, the method comprising the steps of:

the primary controller, receiving a host write command from the host system, the write command including data to be written to the system drive;

the primary controller determining whether said write command encompasses an entire RAID stripe in said storage devices by:

determining a track number of memory tracks allocated for the write command;

determining a physical disk of the RAID stripe in which a first memory track of the data is assigned;

determining an offset number of the first memory track; and determining a total block count for each of the memory tracks;

if the write command encompasses an entire RAID stripe, the primary controller writing said data which encompasses the entire RAID stripe to said disk drive without first writing said data which encompasses the entire RAID stripe to said alternate controller; and if the write command does not encompass an entire RAID stripe, the primary controller writing said data of said write command to said alternate controller and subsequently writing said data of said write command to said storage devices.

2. A method for an adaptive write policy in a data storage system, the data storage system including a host system that is operatively coupled to a primary controller and an alternate controller, the primary controller and the alternate controller being operatively connected to a system drive that includes one or more storage devices, the primary controller being operatively coupled to a first memory, and the alternate controller being operatively coupled to a second memory, the primary controller and the alternate controller managing the data storage system in dual active configuration, the method comprising:

receiving, by the primary controller, a host write command from the host system, the host write command including host write data to be written to the system drive;

when the data storage system is configured with a write-back policy, determining whether the host write command encompasses an entire RAID stripe;

if the host write command encompasses an entire RAID stripe, processing the host write command in accordance with a write-though policy; and otherwise, processing the host write command in accordance with a write-back policy; and wherein the determining further comprises:

determining a track number of memory tracks allocated for the host write command;

determining a physical disk of the RAID strip in which a first memory track of the host write data is assigned to;

determining an offset number of the first memory track;

determining a total block count for each of the memory tracks; and when the track number is equal to a number of data drives in the RAID stripe, the physical disk is a first physical disk of the RAID stripe, the offset number is zero and each total block count is equal to a cache stripe size, setting an I/O process state field to a function that handles write-through write commands.

3. The method of claim 1, wherein the step of the primary controller writing said data which encompasses the entire RAID stripe to said disk drive without first writing said data which encompasses the entire RAID stripe to said alternate controller comprises:

caching, by the primary controller, said data which encompasses the entire RAID stripe into the first memory; and flushing said data which encompasses the entire RAID stripe to the system drive; and sending a write status, corresponding to the host write command, to the host system.

4. The method of claim 3, wherein the step of flushing said data which encompasses the entire RAID stripe further comprises:

generating parity data for each block of said data which encompasses the entire RAID stripe;

writing all blocks of said data which encompasses the entire RAID stripe to the system drive; and writing the parity data to the system drive.

5. The method of claim 1, wherein the step of the primary controller writing said data of said write command to said alternate controller and subsequently writing said data of said write command to said storage devices comprises:

caching, by the primary controller, the data of said write command into the first memory;

mirroring, by the primary controller, the data of said write command to the alternate controller, such that the alternate controller copies the data of said write command into the second memory;

sending a write status, corresponding to the write command, to the host system; and flushing dirty cache data to the system drive.

6. The method of claim 5, wherein the flushing of dirty cache data further comprises:

generating parity data for each block of dirty cache data;

writing all blocks of dirty cache data to the system drive; and writing the parity data to the system drive.

7. A method for storing data in a data storage system including a host system that is operatively coupled to a primary controller and an alternate controller, the primary controller and the alternate controller being operatively connected to a system drive that includes a plurality of data storage devices, the method comprising the steps of:

the primary controller receiving a first write command from the host system, the first write command including data to be written to the system drive;

the primary controller determining whether said first write command, in combination with data previously stored in said primary controller pursuant to a previous write command from said host system, encompasses an entire RAID stripe in said storage devices;

if the first write command, in combination with data previously stored in said primary controller pursuant to a previous write command from said host system, encompasses an entire RAID stripe, the primary controller writing the data which encompasses the entire RAID stripe to said disk drive without first writing said data which encompasses the entire RAID stripe to said alternate controller; and if the first write command, in combination with data previously stored in said primary controller pursuant to a previous write command from said host system, does not encompass an entire RAID stripe, the primary controller writing the data from said first write command to said alternate controller and subsequently writing said data from said first write command to said disk drive; and wherein the step of determining whether the first write command, in combination with data previously stored in said primary controller pursuant to a previous write command from said host system, encompasses an entire RAID stripe, comprises:

determining a track number of memory tracks allocated for the first write command and corresponding cache data;

determining a physical disk of the RAID strip in which a first memory track of the data of said first write command and corresponding cache data is assigned;

determining an offset number of the first memory track;

determining a total block count for each of the memory tracks; and determining when the track number is equal to a number of data drives in the RAID stripe, the physical disk is a first physical disk of the RAID stripe, the offset number is zero and each total block count is equal to a cache stripe size.

8. A data storage system comprising:

a first controller and a second controller operatively coupled to a host system and a system drive, the system drive including one or more disk storage devices, the first controller being operatively coupled to a first memory, the second controller being operatively coupled to a second memory, each of the first and second memories having a respective cache line descriptor data structure which stores:

a number of memory tracks allocated for a write command received from said host system;

a physical disk of a RAID stripe in which a first one of said memory tracks is assigned;

an offset number into said physical disk of said first memory track; and a block count for each of said memory tracks; and wherein the first controller uses information tracked by the cache line descriptor data structure to determine whether the write command encompasses an entirety of said RAID stripe.

9. A data storage system comprising:

a first controller and a second controller operatively coupled to a host system and a system drive, the system drive including one or more disk storage devices, the first controller being operatively coupled to a first memory, the second controller being operatively coupled to a second memory, each of the first and second memories having a respective cache line descriptor data structure which stores:

a number of memory tracks allocated for a write command received from said host system;

a physical disk of a RAID stripe in which a first one of said memory tracks is assigned an offset number into said physical disk of said first memory track; and a block count for each of said memory tracks; and wherein data received with said write command is mirrored by the first controller to a location in the second memory of the second controller when the first controller uses information tracked by the cache line descriptor data structure to determine that the write command does not encompass an entirety of said RAID stripe.

10. The data storage system of claim 9, wherein said data is flushed to the system drive when the first controller uses information tracked by the cache line descriptor data structure to determine that the write command encompass the entire RAID stripe.

11. A controller for operatively connecting to a system drive that includes one or more disk storage devices, and for connecting to a host system to receive write commands, the controller comprising:

a memory having a cache line descriptor data structure which stores;

a number of memory tracks allocated for one of said write commands;

a physical disk of a RAID stripe in which a first one of said memory tracks is assigned;

an offset number of said first memory track; and a block count for each of said memory tracks; and wherein the controller uses information tracked by the cache line descriptor data structure to determine whether each of said write commands encompasses an entirety of said RAID stripe.

12. The controller of claim 11, wherein data within one of said write commands is mirrored by the controller to a location in a second memory of an alternate controller when the first said controller uses information tracked by the cache line descriptor data structure to determine that said one write command does not encompass an entirety of said RAID stripe.

13. The controller of claim 11, wherein data within one of said write commands is flushed to the system drive when the controller uses information tracked by the cache line descriptor data structure to determine that the write command encompasses an entirety of said RAID stripe.

14. The controller of claim 12, wherein the second memory is random access memory located in the alternate controller.

15. A method as set forth in claim 1 wherein the determining step further comprises the step of determining when the track number is equal to a number of data drives in the RAID stripe, the physical disk is a first physical disk of the RAID stripe, and the offset number is zero and each total block count is equal to a cache stripe size.

16. A method as set forth in claim 1 wherein said step of subsequently writing said data of said write command to said storage devices comprises the step of writing said data of said write command which does not encompass an entire RAID stripe from a memory of said primary controller to said storage devices.

17. A computer program product for instructing storage of data in a data storage system including a host system that is operatively coupled to a primary controller and an alternate controller, the primary controller and the alternate controller being operatively connected to a system drive that includes a plurality of data storage devices, the computer program product comprising:

a computer readable medium;

first program instructions for instructing the primary controller to receive a write command from the host system, the write command including data to be written to the system drive;

second program instructions for determining whether said write command encompasses an entire RAID stripe in said storage devices by:

determining a track number of memory tracks allocated for the write command;

determining a physical disk of the RAID stripe in which a first memory track of the data is assigned to;

determining an offset number of the first memory track; and determining a total block count for each of the memory tracks;

if the write command encompasses an entire RAID stripe, third program instructions for the primary controller to write said data which encompasses the entire RAID stripe to said disk drive without first writing said data which encompasses the entire RAID stripe to said alternate controller; and if the write command does not encompass an entire RAID stripe, fourth program instructions for the primary controller to write said data of said write command which does not encompass an entire RAID stripe to said alternate controller and subsequently write said data of said write command which does not encompass an entire RAID stripe to said storage devices; and wherein said first, second, third and fourth program instructions are recorded on said medium.

18. A computer program product as set forth in claim 17 wherein said data of said write command that does not encompass an entire RAID stripe is written to a memory of said primary controller, and the writing of said data of said write command data which does not encompasses the entire RAID stripe to said storage devices comprises writing said data which does not encompass the entire RAID stripe from said memory to said storage devices.

* * * * *